United States Patent
Shiino et al.

(10) Patent No.: US 7,290,638 B2
(45) Date of Patent: Nov. 6, 2007

(54) ELECTRIC POWER STEERING SYSTEM

(75) Inventors: Kohtaro Shiino, Kanagawa (JP); Fumiyuki Yamaoka, Kanagawa (JP); Tadaaki Fujii, Saitama (JP); Toshiro Yoda, Saitama (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 11/131,354

(22) Filed: May 18, 2005

(65) Prior Publication Data

US 2005/0257992 A1 Nov. 24, 2005

(30) Foreign Application Priority Data

May 19, 2004 (JP) ............................. 2004-148894

(51) Int. Cl.
*B62D 5/04* (2006.01)

(52) U.S. Cl. ..................................... 180/444; 180/446

(58) Field of Classification Search ................ 180/444, 180/446, 407, 402
See application file for complete search history.

(56) References Cited

U.S. PATENT DOCUMENTS

| | | | | |
|---|---|---|---|---|
| 4,741,409 | A * | 5/1988 | Westercamp et al. ........ | 180/413 |
| 6,176,341 | B1 * | 1/2001 | Ansari ......................... | 180/402 |
| 6,345,681 | B1 * | 2/2002 | Hackl et al. ................. | 180/402 |
| 6,484,839 | B2 * | 11/2002 | Cole ............................ | 180/402 |
| 6,763,907 | B2 * | 7/2004 | Ueno et al. .................. | 180/444 |
| 6,929,090 | B2 * | 8/2005 | Furumi et al. ............... | 180/446 |
| 7,014,008 | B2 * | 3/2006 | Furumi et al. ............... | 180/443 |
| 2006/0054378 | A1 * | 3/2006 | Tanaka et al. ............... | 180/444 |

FOREIGN PATENT DOCUMENTS

| | | |
|---|---|---|
| DE | 197 54 258 A1 | 6/1999 |
| DE | 103 24 632 B4 | 8/2005 |
| DE | 603 03 841 T2 | 8/2006 |
| JP | 2002-154442 A | 5/2002 |
| WO | 2004/014713 A1 | 2/2004 |

* cited by examiner

*Primary Examiner*—Tony Winner
(74) *Attorney, Agent, or Firm*—Sughrue Mion Pllc.

(57) ABSTRACT

An electric power steering system, includes a torque sensor disposed to a steering shaft to detect a steering torque. A first pinion is disposed to the steering shaft. A rack shaft is in mesh with the first pinion and connected with the steering shaft to change a rotational motion of the steering shaft to an axial motion of the rack shaft and provided to be operated in relation to the steering shaft. A first motor is connected with the first pinion to generate a steering assist torque in accordance with the steering torque detected by the torque sensor. A second pinion is disposed to be separate from the first pinion and in mesh with the rack shaft. A second motor is connected with the second pinion to generate a steering assist torque in accordance with the steering torque. A first control circuit is provided on a first control board for the first motor. A second control circuit is provided on the second control board for the second motor. The first control circuit monitors an abnormality in control state of the second control circuit and the second control circuit monitors an abnormality in control of the first control circuit.

12 Claims, 15 Drawing Sheets

ELECTRIC POWER STEERING SYSTEM

BACKGROUND OF THE INVENTION

This invention relates to improvements in an electric power steering system for an automotive vehicle, in which a steering force of a driver is assisted by an electric motor.

In a conventional power steering system, a so-called dual pinion type electric power steering system is disclosed in Japanese Patent Provisional Publication No. 2002-154442. In the dual pinion type electric power steering system, a steering torque from a driver and an assist torque generated by a motor are respectively provided to separate pinions, thereby providing a merit of decreasing load to be applied to the pinions.

SUMMARY OF THE INVENTION

However, with the above dual pinion type electric power steering system, steering assist torque is generated only by one motor similarly to usual electric power steering systems. Therefore, there arises a problem that a sufficient steering assist torque cannot be secured in case of applying the conventional technique to a large-sized vehicle which needs a larger steering assist torque.

Therefore, it is an object of the present invention to provide an improved electric power steering system which can effectively overcome drawbacks encountered in conventional electric power steering systems.

Another object of the present invention is to provide an improved electric power steering system by which a sufficient steering assist torque can be secured even in case of applying the electric power steering system to a vehicle which needs a larger steering assist torque.

An aspect of the present invention resides in an electric power steering system which comprises a steering shaft disposed to a steering wheel. A torque sensor disposed to the steering shaft to detect a steering torque generated by the steering shaft. A first pinion is disposed to the steering shaft. A rack shaft is in mesh with the first pinion and connected with the steering shaft to change a rotational motion of the steering shaft to an axial motion of the rack shaft and to be operated in relation to the steering shaft. A first motor is connected with the first pinion to generate a steering assist torque in accordance with the steering torque detected by the torque sensor. A second pinion is disposed to be separate from the first pinion and in mesh with the rack shaft. A second motor is connected with the second pinion to generate a steering assist torque in accordance with the steering torque.

Another aspect of the present invention resides in an electric power steering system which comprises a steering wheel to which a steering shaft is connected. A steering load detecting mechanism is provided for detecting a steering load applied to the steering wheel. A first pinion is disposed. A rack shaft is in mesh with the first pinion and connected with the steering shaft to change a rotational motion of the steering shaft to an axial motion of the rack shaft and to be operated in relation to the steering shaft. A first motor is connected with the first pinion to generate a steering assist torque in accordance with the steering load detected by the steering load detecting mechanism. A second pinion is disposed to be separate from the first pinion and in mesh with the rack shaft. A second motor is connected with the second pinion to generate a steering assist torque in accordance with the steering load.

A further aspect of the present invention resides in an electric power steering system which comprises a steering shaft which is disposed to a steering wheel. A torque sensor disposed to the steering shaft to detect a steering torque generated by the steering shaft. A first pinion is disposed to the steering shaft. A rack shaft is in mesh with the first pinion and connected with the steering shaft to change a rotational motion of the steering shaft to an axial motion of the rack shaft and provided to be operated in relation to the steering shaft. A first motor is connected with the first pinion to generate a steering assist torque in accordance with the steering torque detected by the torque sensor. A second pinion is disposed to be separate from the first pinion and in mesh with the rack shaft. A second motor is connected with the second pinion to provide a steering assist torque to the rack shaft.

BRIEF DESCRIPTION OF THE DRAWINGS

In the drawings, like reference numerals designate like parts and elements throughout all figures.

DETAILED DESCRIPTION OF THE INVENTION

Referring now to FIGS. 1 to 12B, a first embodiment of an electric power steering system for an automotive vehicle according to the present invention is illustrated.

System Configuration of Electric Power Steering System

Figure 1:
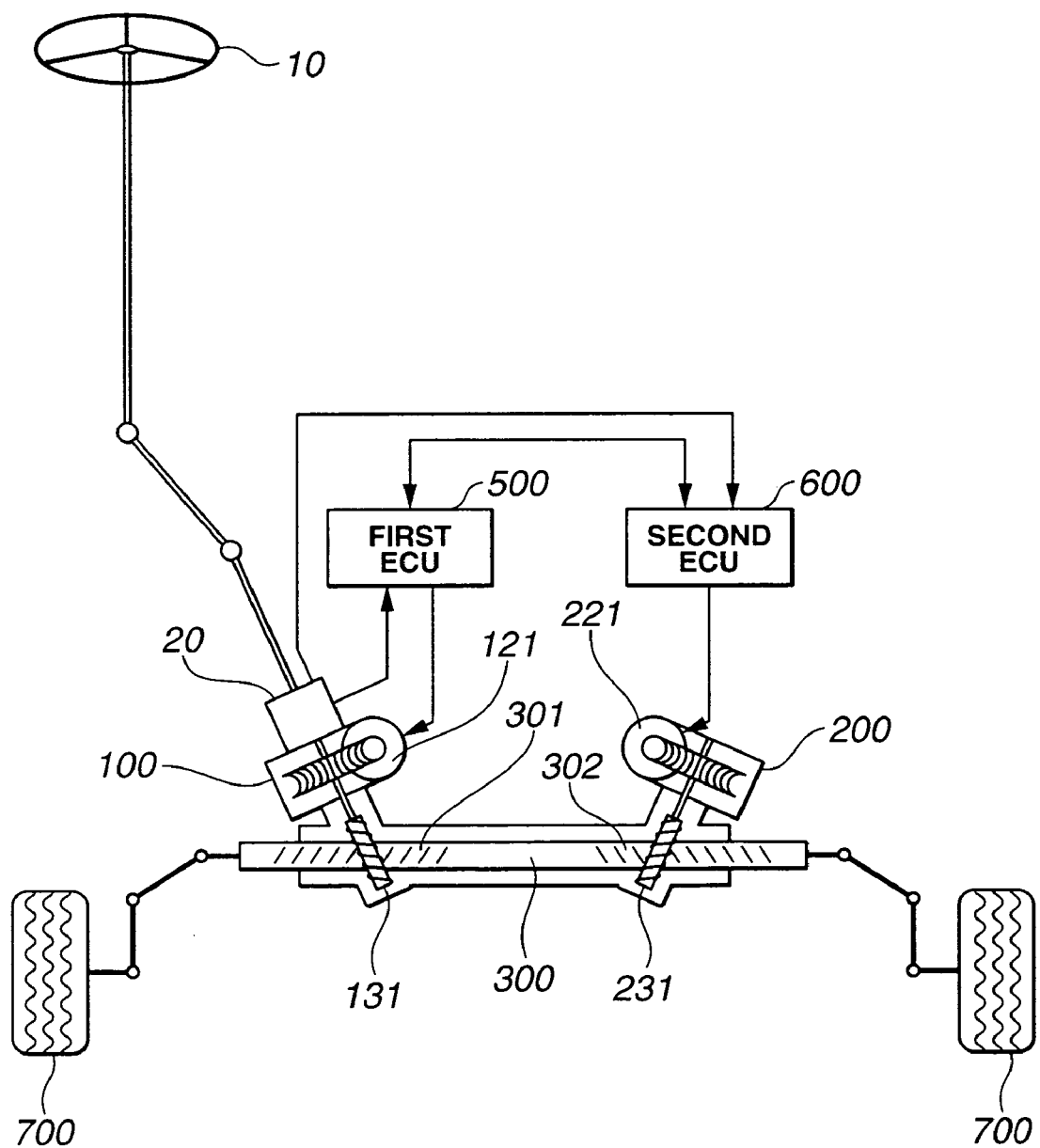
FIG. 1 is a schematic illustration of a first embodiment of an electric power steering system according to the present invention.

FIG. 1 is a schematic illustration showing a system configuration of the electric power steering system according to the first embodiment. The electric power steering system includes steering wheel 10. Steering wheel 10 is connected with torque sensor or steering load detecting mechanism 20. Torque sensor 20 is disposed to first unit 100. First unit 100 has first ECU (Electronic Control Unit) or control circuit 500 and connected with rack shaft 300. Second unit 200 has second ECU or control circuit 600 and connected with rack shaft 300. First ECU 500 and second ECU 600 are electrically connected with each other. Rack shaft 300 is connected with road wheels 700. First unit 100 and second unit 200, as power assist units, are disposed spaced from each other in the axial direction of rack shaft 300. Each of first and second units 100, 200 provides assist torque to rack shaft 300 through first pinion 131 and second pinion 231 under motor driving. First unit 100 and second unit 200 are power assist units which respectively include first motor 121 and second motor 221. First motor 121 and second motor 221 are respectively driven by first ECU 500 and second ECU 600 which are respectively accommodated in first unit 100 and second unit 200 so that assist torque is provided to rack shaft 300. First unit 100 also includes torque sensor 20 which is connected with steering wheel 10.

Rack shaft 300 is driven by first pinion 131 and second pinion 231 so as to move in the axial direction thereof. Rack shaft 300 includes two teeth portions i.e., first engaging area 301 to which first pinion 131 is engaged and second engaging area 302 to which second pinion 231 is engaged. First engaging area 301 and second engaging area 302 respectively have teethes which are different in inclination relative to a horizontal plane containing the axis of rack shaft 300. First ECU 500 and second ECU 600 respectively drive first motor 121 and second motor 221 which are respectively accommodated in first unit 100 and second unit 200, in accordance with a steering torque or steering load detected by torque sensor 20, thereby providing assist torque to rack shaft 300 connected with road wheels 700. First ECU 500 and second ECU 600 also have a function for detecting failure by monitoring control condition of ECU each other. In case that either one of first motor 121 or second motor 221 makes failure, assist torque is provided to rack shaft 300 only by the other or normally operating motor.

Entire Configuration of Electric Power Steering System

Figure 2:
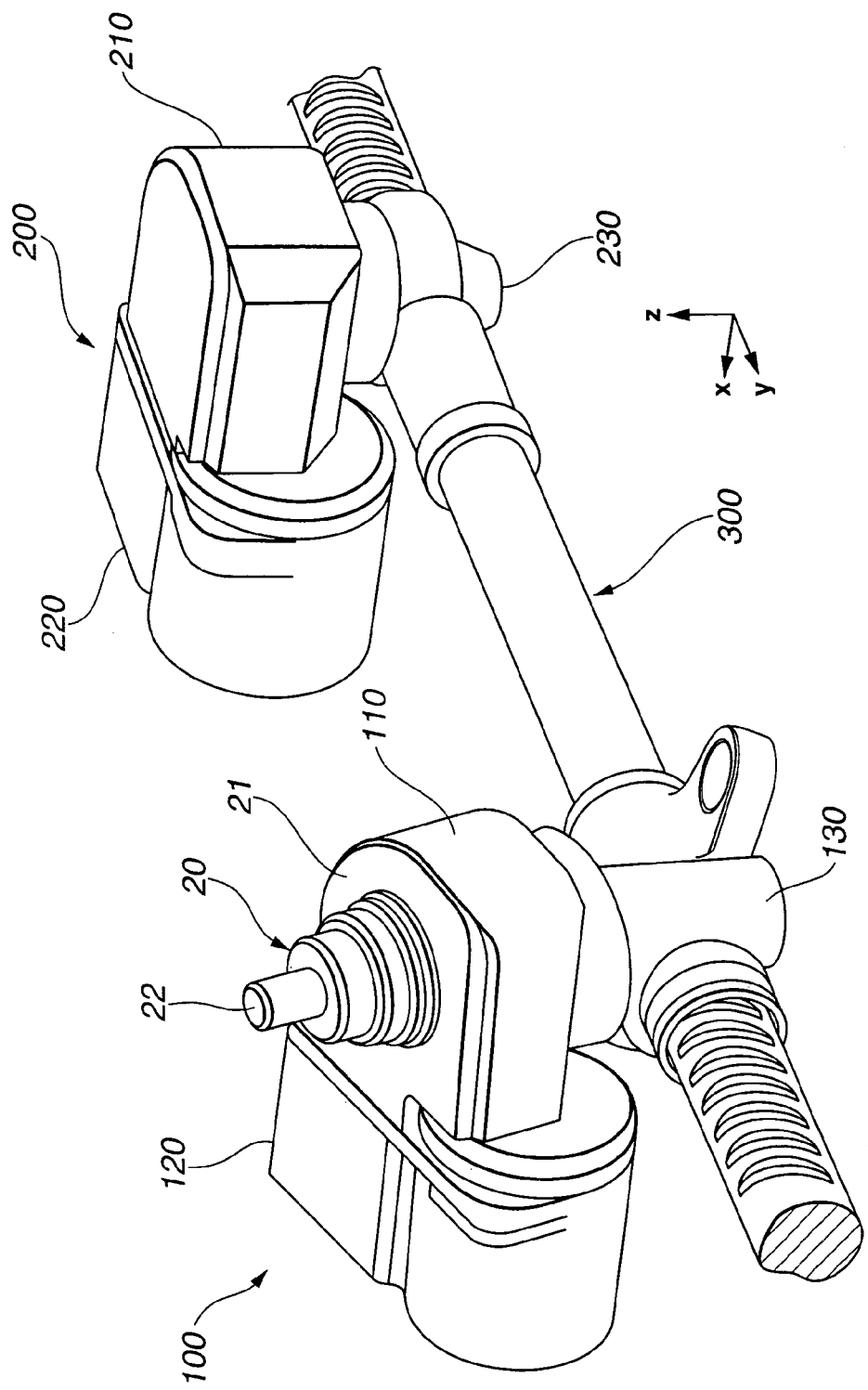
FIG. 2 is a perspective view of an entire configuration of the electric power steering system of FIG. 1.

FIG. 2 is a perspective view showing an entire configuration of the electric power steering system according to the first embodiment. First unit 100 includes first pinion housing 110, first motor housing 120, and torque sensor housing 21. Torque sensor housing 21 houses therein input shaft 22 (or a part of a steering shaft). The steering shaft is connected to steering wheel 10. First pinion housing 110 houses therein first pinion shaft 130. First motor housing 120 houses therein first (electric) motor 121 which is a brush-less motor and is assembled from a radial direction relative to both input shaft 22 and first pinion shaft 130. First pinion shaft 130 is formed integral with first pinion 131. First pinion 131 is in mesh with rack shaft 300 thereby transmitting assist torque generated by first motor 121 to rack shaft 300.

Second unit 200 includes second pinion housing 210, and second motor housing 220. Second pinion housing 210 houses therein second pinion shaft 230. Second motor housing 220 houses therein second (electric) motor 221 which is a brush-less motor and is assembled from a radial direction relative to second pinion shaft 230. Second pinion shaft 230 is also formed integral with second pinion 231 similarly to first pinion shaft 130. Second pinion 231 is in mesh with rack shaft 300 thereby transmitting assist torque generated by second motor 221 to rack shaft 300. First pinion housing 110, first motor housing 120 and first motor 121 in first unit 100 are respectively the same in type as second pinion housing 210, second motor housing 220 and second motor 221 in second unit 200 so that component parts can be commonly used in first unit 100 and second unit 200.

First pinion 131 and second pinion 231 respectively have numbers of teeth which numbers are not dividable by each other and different from each other. Providing the different numbers of teeth to the first and second pinions 131, 231 causes first motor 121 and second motor 221 to cancel vibration frequency each other thereby preventing generation of resonance.

Entire Configuration of First Unit

Figure 3:
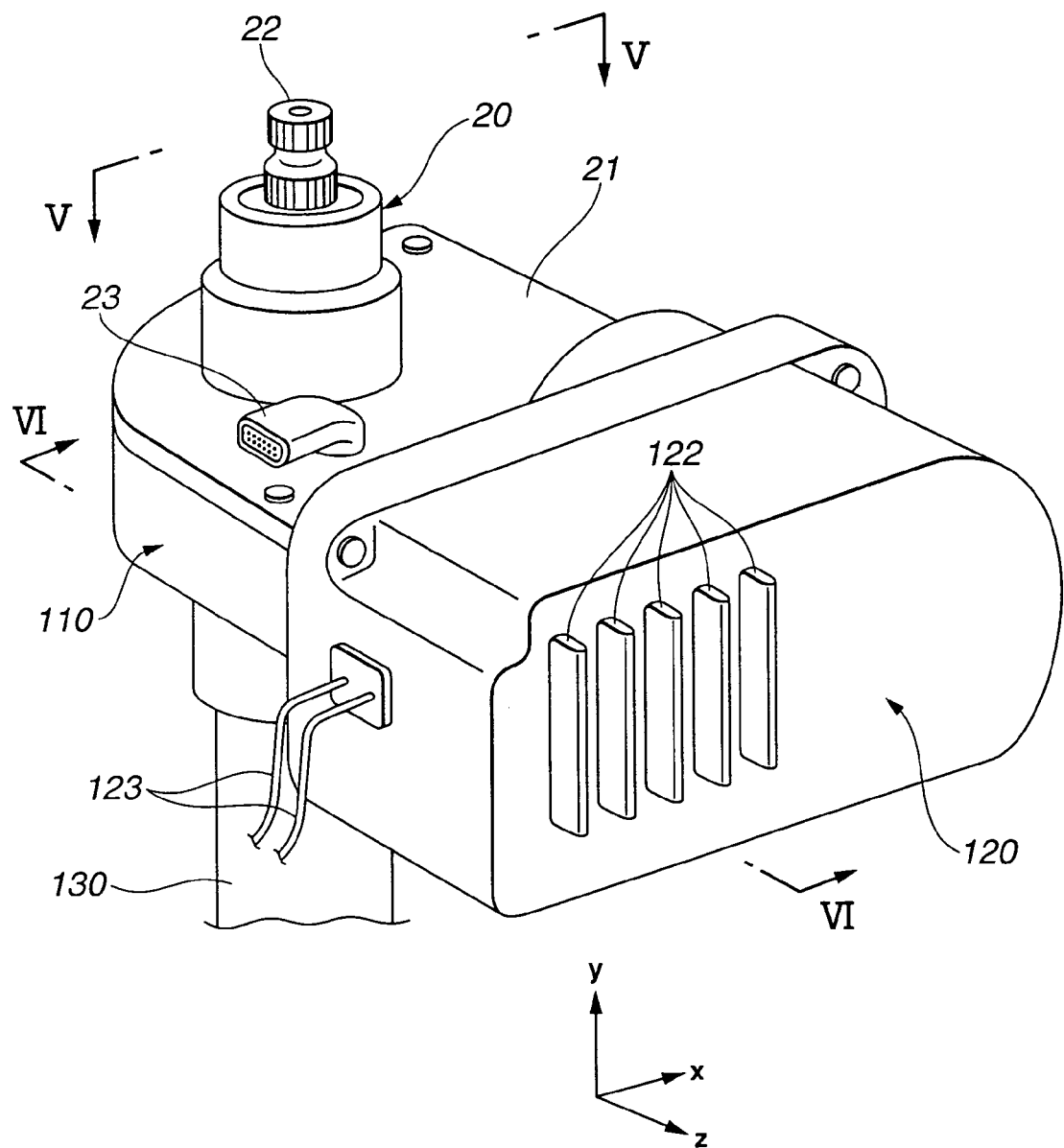
FIG. 3 is a perspective view of an entire configuration of a first unit in the electric power steering system of FIG. 1.

FIG. 3 is a perspective view showing an entire configuration of first unit 100 in the electric power steering system according to the first embodiment. First motor housing 120 houses therein first motor 121 which is assembled from a radial direction to input shaft 22 inside torque sensor housing 21 and to first pinion shaft 130 inside first pinion housing 110. First motor housing 120 is provided with first heat sink 122 which is located at its outer surface of first motor housing 120 and opposite to torque sensor housing 21 with respect to a base section (not identified) of first motor housing 120. First motor housing 120 houses therein first power system control board 124. First power system control board 124 is located backside of first heat sink 122 and controls first motor 121. Torque sensor housing 21 is provided at its top surface (in a y-axis normal direction) with first connector 23 for vehicle signal 23. First connector 23 for vehicle signal is formed integral with torque sensor housing 21 and located outside of input shaft 22. Vehicle signals (for example, signals relating to vehicle speed, ignition and the like) are input to first ECU 500 through first connector 23 for vehicle signal. First motor housing 120 is formed with a through-hole section through which first power harness 123 is connected with first power system control board 124.

Detailed Configuration of First Unit

Figure 4:
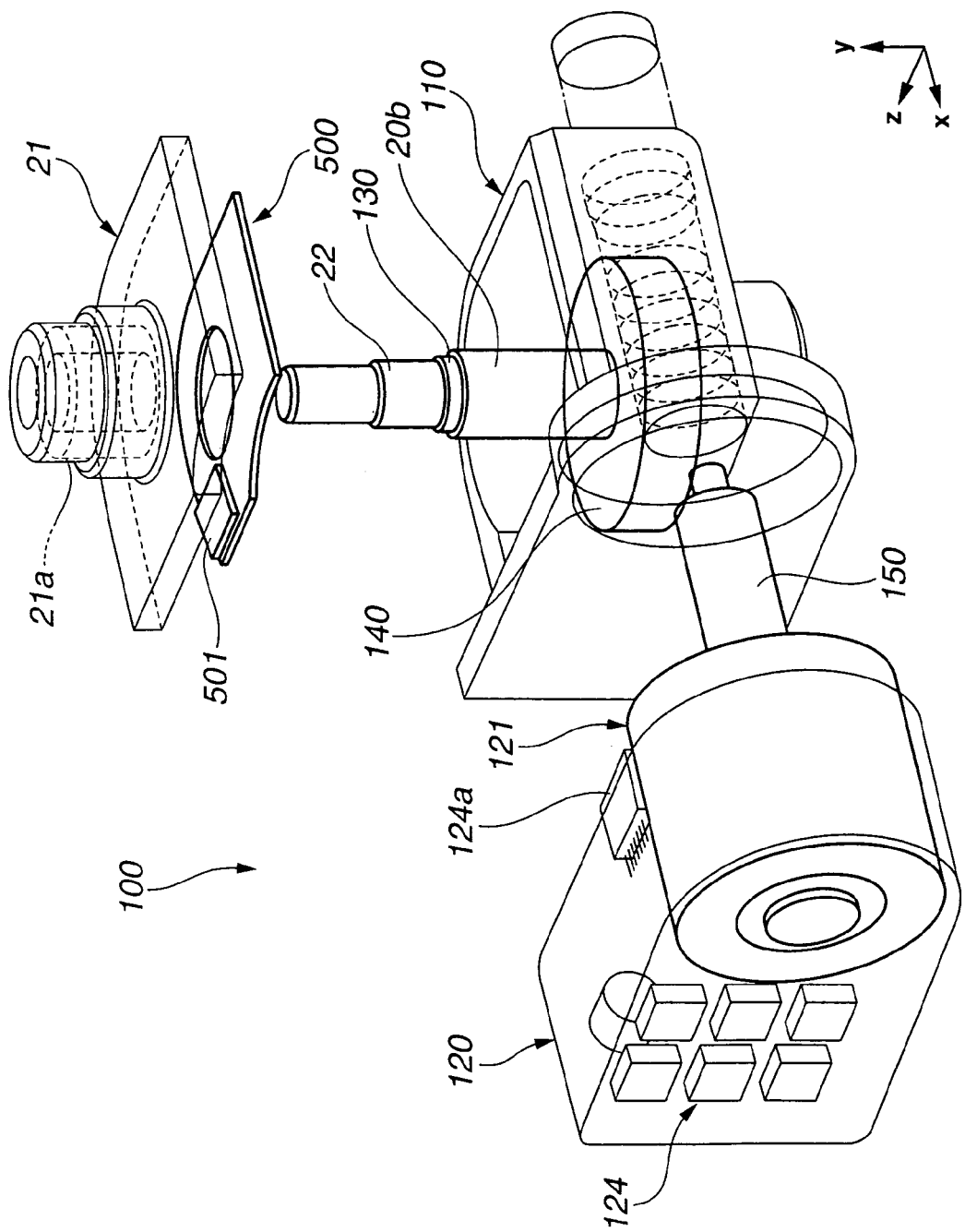
FIG. 4 is an exploded perspective view showing installation of the first unit in the electric power steering system of FIG. 1.

FIG. 4 is a schematic perspective view showing assembly of first unit 100 in the electric power steering system according to the first embodiment. In FIG. 4, for the purpose of illustration, a x-axis (normal) direction, a y-axis (normal) direction and a z-axis (normal) direction are indicated respectively by an arrow x, an arrow y and an arrow z. As discussed above, to first motor housing 120, first motor 121 and first power system control board 124 are assembled as component parts. First power system control board 124 includes connector 124a for first power system control board. Connector 124*a* for first power system control board is formed on the top surface (in the y-axis direction) of first motor housing 120 and connected with connector 501 for first ECU, disposed in first ECU 500 so as to serve as an input passage for control information. Input shaft 22 is connected with first pinion shaft 130 through torsion bar 26 as a single member. First worm wheel 140 is assembled to first pinion shaft 130 and stored in first pinion housing 110 from the y-axis normal direction. Additionally, first motor housing 120 is assembled to first pinion housing 110 from the x-axis normal direction. First worm shaft 150 is in mesh with first worm wheel 140. Torque sensor housing 21 is formed by plastic-molding and formed at its top surface with insertion section 21*a* which is in the cylindrical shape for insertion of input shaft 22 in the y-axis normal direction. Insertion section 21*a* houses along its inner peripheral surface torque sensor 20 by using insert-molding. During assembly operation, torque sensor housing 21 is assembled to first pinion housing 110 from the y-axis normal direction in a laminating manner with first worm wheel 140 so that first ECU 500 is disposed between them, in which input shaft 22 is inserted into insertion section 21*a*. Additionally, although an assist amount for steering is determined by torque sensor 20 in the first embodiment, the assist amount may be determined upon detecting a steering angle (or rotational angle of the steering wheel) by using a steering angle sensor. A mode for determining the assist amount for steering is not particularly limited to that discussed above.

Detail Around Input Shaft and First Pinion Shaft in First Unit

Figure 5:
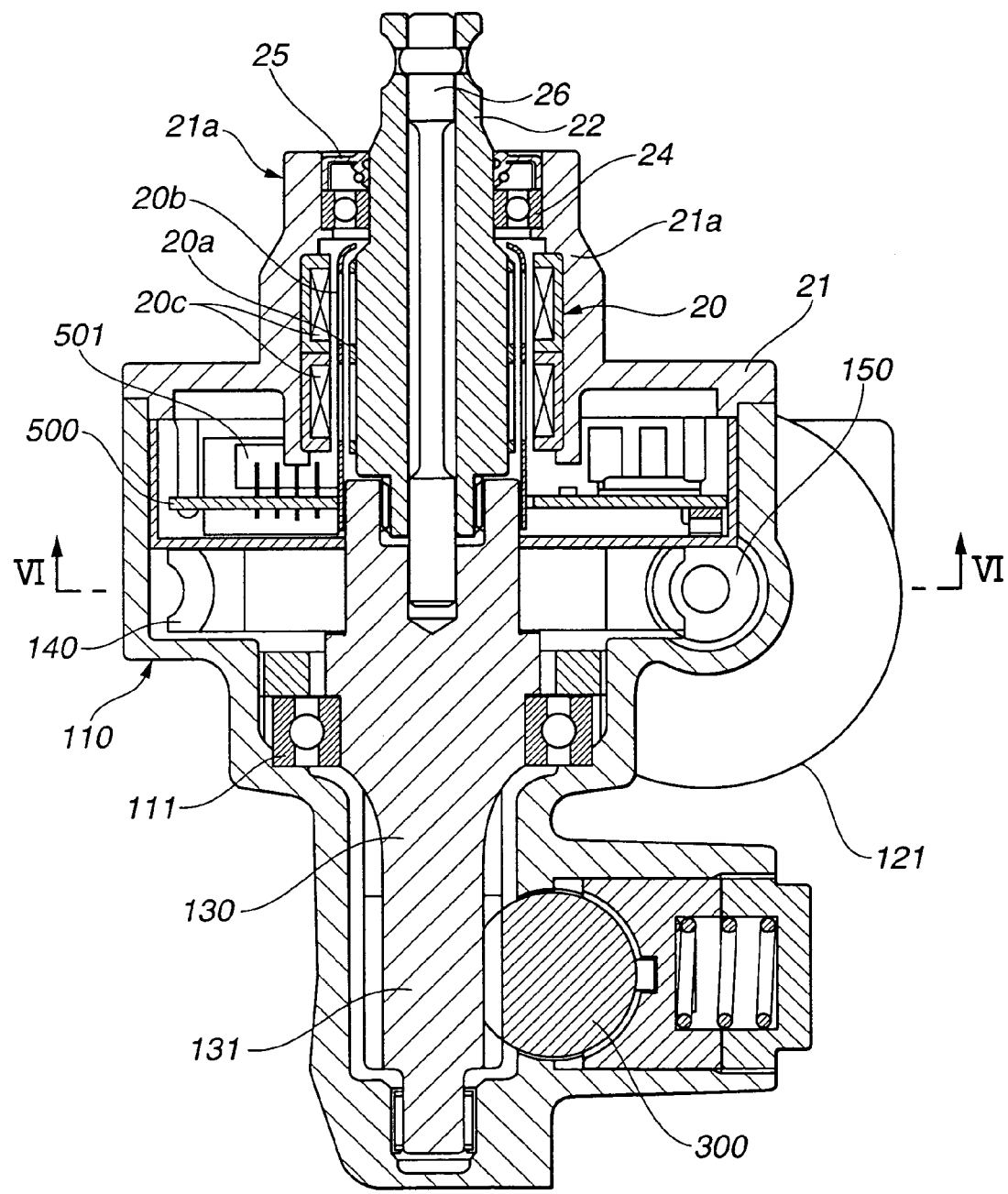
FIG. 5 is a sectional view taken on line V-V of FIG. 3, showing a section around an input shaft and a first pinion shaft in the first unit of FIG. 3.

FIG. 5 is a sectional view taken on line V-V of FIG. 3, showing a section around an input shaft and the first pinion shaft in the first unit 100, according to the first embodiment. Input shaft 22 is supported through bearing 24 by insertion section 21*a* of torque sensor housing 21. The lower end section of input shaft 22 is relatively rotatably supported by the one end section of first pinion shaft 130. Dust seal 25 is disposed between input shaft 22 and an inner peripheral surface of an opening section formed in torque sensor housing 21 thereby preventing dust or the like from entering into first unit 100. Torque sensor 20 is disposed along an inner peripheral surface of torque sensor housing 21 and an outer peripheral surface of input shaft 22. Torque sensor 20 is constituted of inner ring 20*a*, outer ring 20*b* and two sets of coils 20*c*. Inner ring 20*a* has a plurality of windows and rotates with input shaft 22 as a single member. Outer ring 20*b* has a plurality of windows and rotates with first pinion shaft 130 as a single member. Two sets of coils 20*c* are disposed along an inner peripheral surface of torque sensor housing 21 and along an outer peripheral surface of outer ring 20*b*.

In case that torsion bar 26 is twisted upon turning of steering wheel 10 by a driver so as to steer the vehicle, input shaft 22 rotates relative to first pinion shaft 130 so that a change of an impedance in coil 20*c* is detected. The change of the impedance is output as a torque sensor signal to first and second ECUs 500, 600. Although torque sensor 20 is formed integral with torque sensor housing 21 in this first embodiment, torque sensor 20 may be assembled separate from torque sensor housing 21, so that a mode for assembling torque sensor 20 is not particularly limited to that discussed above. Torque sensor housing 21 is formed with an annular space which surrounds the outer peripheral surface of input shaft 22. In this space, a substrate or control board on which first ECU 500 is mounted is located to be adjacent to torque sensor 20. First ECU 500 is provided with connector 501 for the first ECU which connector is connected with connector 124*a* for the first power system control board, disposed in first power system control board 124. First pinion shaft 130 is supported through bearing 111 by first pinion housing 110 and is provided at its outer peripheral surface with first worm wheel 140. First worm wheel 140 is in mesh with first worm shaft 150 connected with first motor 121.

Detail Around First Worm Wheel and First Motor of First Unit

Figure 6:
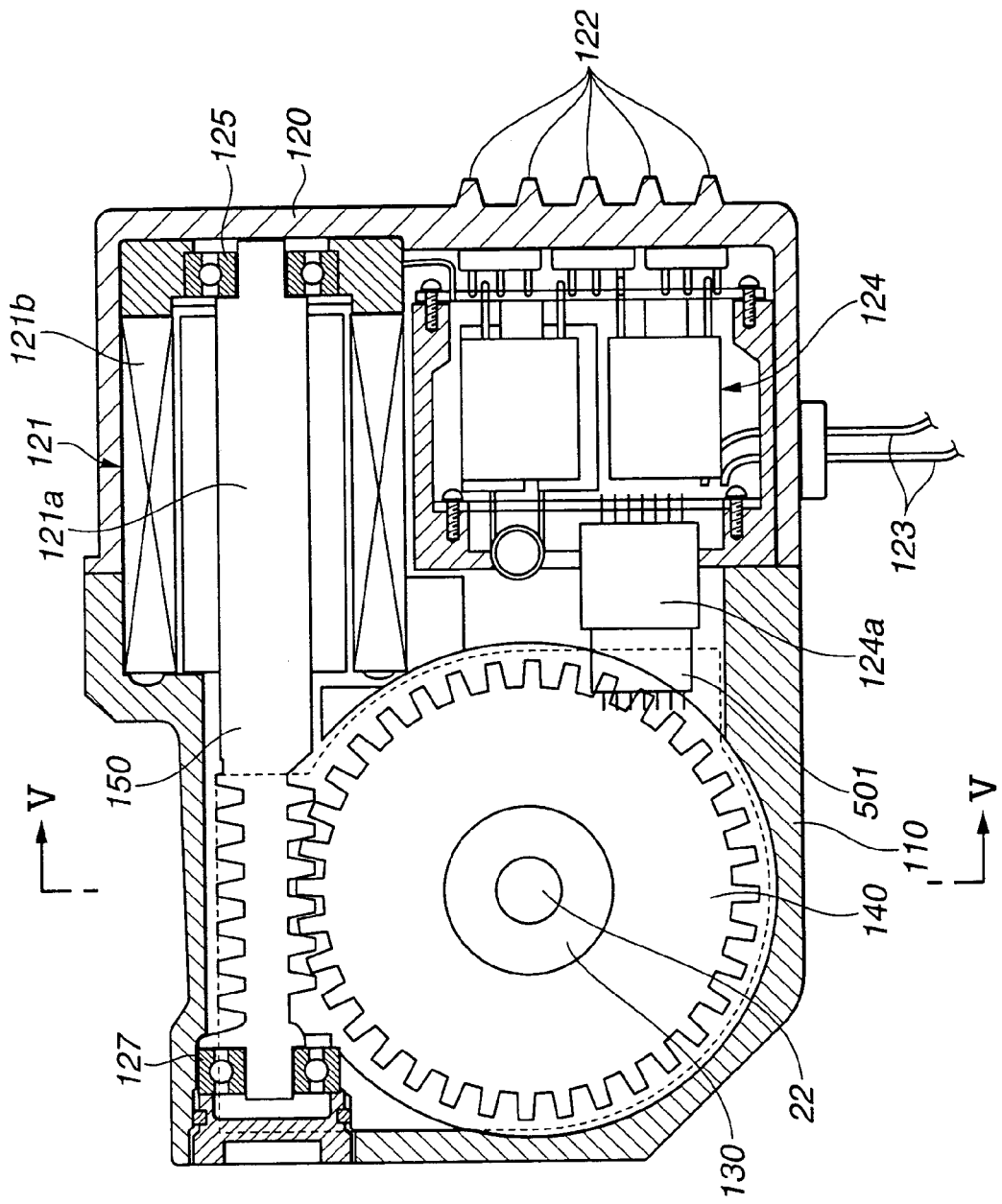
FIG. 6 is a sectional view taken on line VI-VI of FIG. 5, showing a section around a first worm wheel and a first motor of the electric power steering system of FIG. 1.

FIG. 6 is a sectional view taken on line VI-VI of FIG. 5, showing a section around first worm wheel 140 and first motor 121 of the electric power steering system according to the first embodiment. First motor housing 120 is installed to first pinion housing 110 from a radial direction of input shaft 22. First pinion housing 110 has an opened side to which first motor housing 120 is installed. In the similar way, first motor housing 120 has an opened side to which first pinion housing 110 is installed. First motor housing 120 and first pinion housing 110 are fixed with each other so that the insides of first motor housing 120 and first pinion housing 110 are communicated with each other. First motor 121 includes first rotor 121*a* which is rotated with first worm shaft 150 as a single member. First worm shaft 150 is formed at its outer periphery with first worm gear 160. First stator coil 121*b* is located around first rotor 121*a*. First worm shaft 150 is supported to both first motor housing 120 and first pinion housing 110 through bearings 125 and 127, thus supporting first motor shaft 150 with two bearings. As a result, the number of bearings is decreased thereby making a mechanism compact in axial direction of first worm shaft 150. First motor housing 120 houses therein first power system control board 124 which is located outside first motor 121 in a radial direction of first motor 121 so as to drivingly control first motor 121. First power system control board 124 includes a condenser, a power transistor, a relay, a coil and the like. As shown in FIG. 6, first power system control board 124 is located adjacent to the radial outside of first motor 121 and adjacent to the radial outside of first worm wheel 140.

As shown also in FIG. 3, first motor housing 120 is provided on its outer surface with first heat sink 122 which allows heat of first power system control board 124 to radiate to atmosphere. First heat sink 122 is located at the backside of first power system control board 124. In case of thus using first motor housing 120 as a heat sink, first motor housing 120 is preferable to be formed of aluminum or the like from the view point of heat radiation. First motor housing 120 is formed with a through-hole section through which first power harness 123 is connected to first power system control board 124. First power system control board 124 has connector 124*a* for first power system control board. Connector 124*a* is connected with connector 501 for first ECU, disposed in first ECU 500, around a connecting section between first pinion housing 110 and first motor housing 120. Connector 501 for first ECU and connector 124*a* for first power system control board are disposed at the generally same height or position in the y-axis direction in FIG. 4 as first ECU 500 housed within first pinion housing 110.

As discussed above, first motor 121 and first power system control board 124 constitute a power system unit for first unit 100, housed within first motor housing 120 so as to be arranged as a single unit. Additionally, torque sensor housing 21 is coupled with first pinion housing 110 thereby constituting a single unit in which first ECU 500 is stored. Thus, each of the power system unit and a control system unit can be formed as a single integral unit thereby facilitating installation of each unit to the vehicle. Furthermore, as shown in FIG. 5, first motor 121, first worm shaft 150 and first worm wheel 140 are arranged along a generally L-shaped line, thereby making the steering system small-sized.

Entire Configuration of Second Unit

Figure 7:
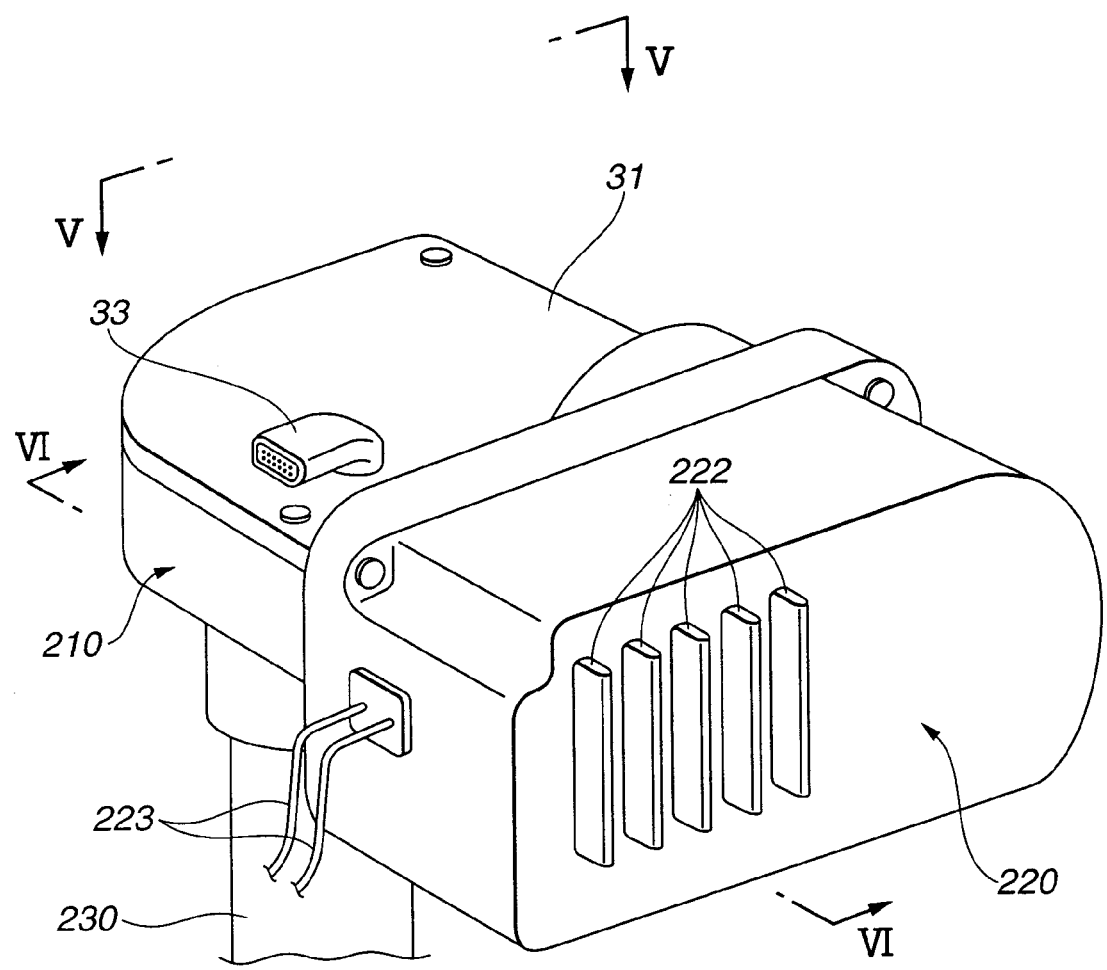
FIG. 7 is a perspective view of an entire configuration of a second unit in the electric power steering system of FIG. 1.

FIG. 7 is a perspective view showing an entire configuration of second unit 200 in the electric power steering system according to the first embodiment. Second motor housing 220 houses therein second motor 221. Second motor 221 is assembled to second motor housing 220 from a radial direction to pinion shaft 230 inside pinion housing 210. Second motor housing 220 is provided on its outer surface with second heat sink 222 similarly to first motor housing 120. Second power system control board 224 which drivingly controls second motor 221 is disposed at the backside of second heat sink 222. Second motor housing 220 is also preferable to be formed of aluminum from the viewpoint of a heat radiation, similarly to first motor housing 120.

Second pinion housing 210 has an upper section closed with lid member 31, so that second unit 200 is different from first unit 100 in such a point as not to be provided with the torque sensor. Therefore, lid member 31 closes the top surface of pinion housing 210. Lid member 31 is integrally formed with second connector 33 for vehicle signal, through which connector various vehicle signals (signals relating to vehicle speed, ignition and the like) are input to second ECU 600. Second unit 200 is formed with a through-hole section through which second power harness 223 is connected with second power system control board 224. Similarly to first unit 100, second power harness 223 is connected to second power system control board 224 through the through-hole section of the second motor housing 220. Second power system control board 224 has connector 224a for the second power system control board. Second ECU 600 has connector 601 for the second ECU. Connector 224a for the second power system control board is connected with connector 601 for the second ECU, around a connecting section between second pinion housing 210 and second motor housing 220. Connector 601 for the second ECU and connector 224a for the second power system control board are disposed at the generally same height or position in the y-axis direction in FIG. 8 as second ECU 600 housed within second pinion housing 210. Similarly to first unit 100, second motor 221 and second power system control board 224 constitute a power system unit for second unit 200. The power system unit is housed in second motor housing 220 so as to be arranged as a single unit.

Detailed Configuration of Second Unit

Figure 8:
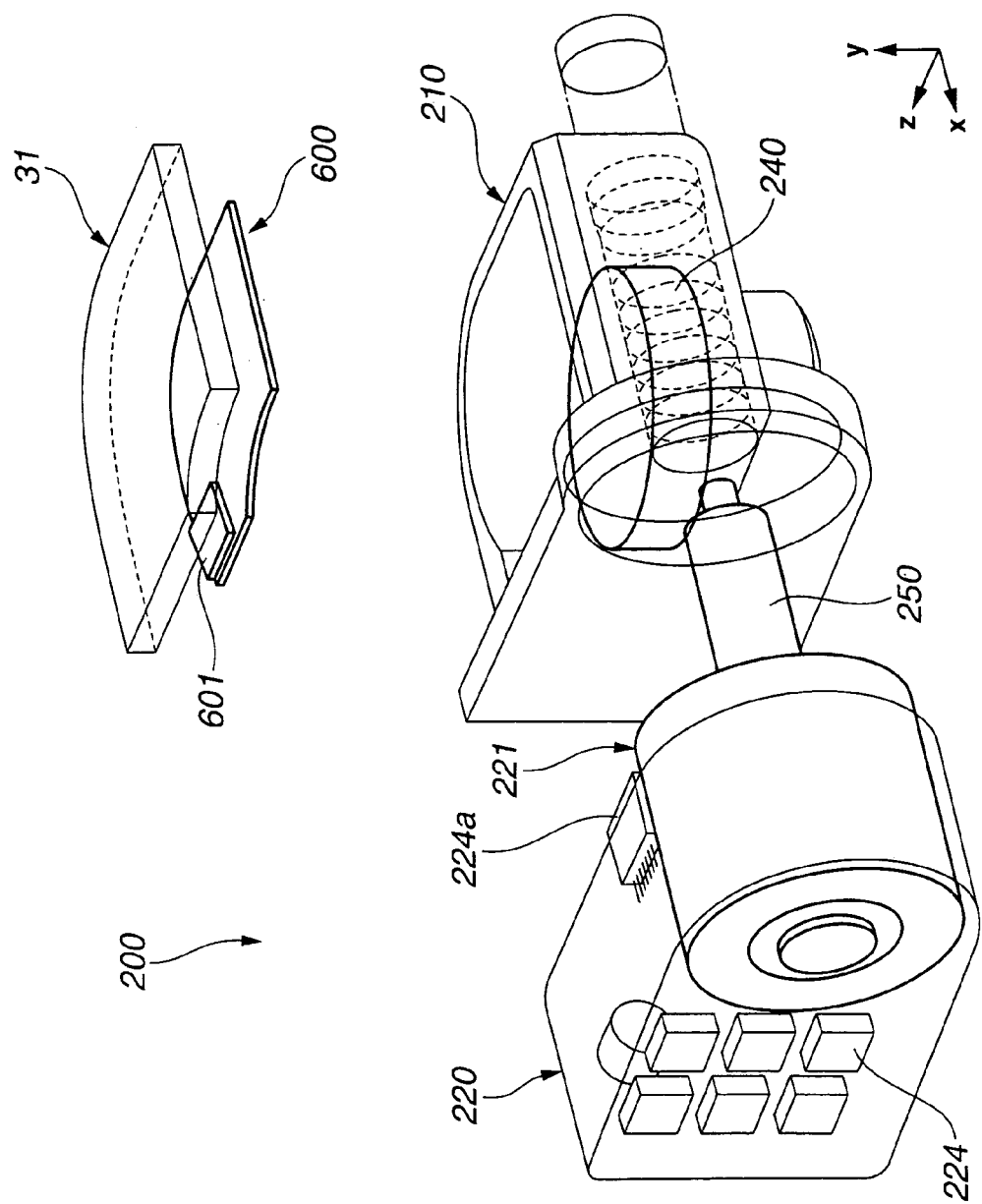
FIG. 8 is an exploded perspective view showing installation of the second unit in the electric power steering system of FIG. 1.

FIG. 8 is a schematic perspective view showing assembly of the second unit 200 in the electric power steering system according to the first embodiment. In FIG. 8, for the purpose of illustration, the x-axis (normal) direction, the y-axis (normal) direction and the z-axis (normal) direction are indicated respectively by the arrow x, the arrow y and the arrow z. Second unit 200 includes second motor housing 220 to which second motor 221 and second power system control board 224 are assembled as constituting elements, similarly to first unit 100. Second motor housing 220 is assembled to second pinion housing 210 from the x-axis normal direction. Second worm shaft 250 is in mesh with second worm wheel 240. During assembly operation, lid member 31 is assembled to second pinion housing 210 from the y-axis normal direction in such a laminating manner to second worm wheel 240 that second ECU 600 is interposed between lid member 31 and second pinion housing 210.

Detail Around Second Worm Wheel and Second Motor of Second Unit

Second unit 200 does not include torque sensor 20, and therefore second unit 200 has lid member 31 in place of torque sensor housing 21 in first unit 100. First pinion 131 of first unit 100 and second pinion 231 of second unit 200 respectively have numbers of teeth which numbers are not dividable by each other and different from each other. Except for these component parts, first unit 100 is the same as second unit 200 in component parts. Therefore, a configuration around second worm wheel 240 and second motor 221 in second unit 200 is the same as that around first worm wheel 140 and first motor 121 in first unit 100, so that detailed illustration and discussion are omitted.

Failure Monitoring Control Between First Unit and Second Unit Each Other

First and second ECUs 500, 600 respectively drive first and second motors 121, 221 in first and second units 100, 200 in accordance with the steering torque detected by torque sensor 20 so that first and second motors 121, 221 respectively provide assist torque to rack shaft 300 connected with road wheels 700. Additionally, both first and second ECUs 500, 600 have a function of monitoring the control state of each other and detecting failure. In case that a failure in either first and second motors 121, 221 is detected, the motor driving-control of the motor in failure is stopped so that assist torque is provided only by the other motor in a normal control state.

Figure 9:
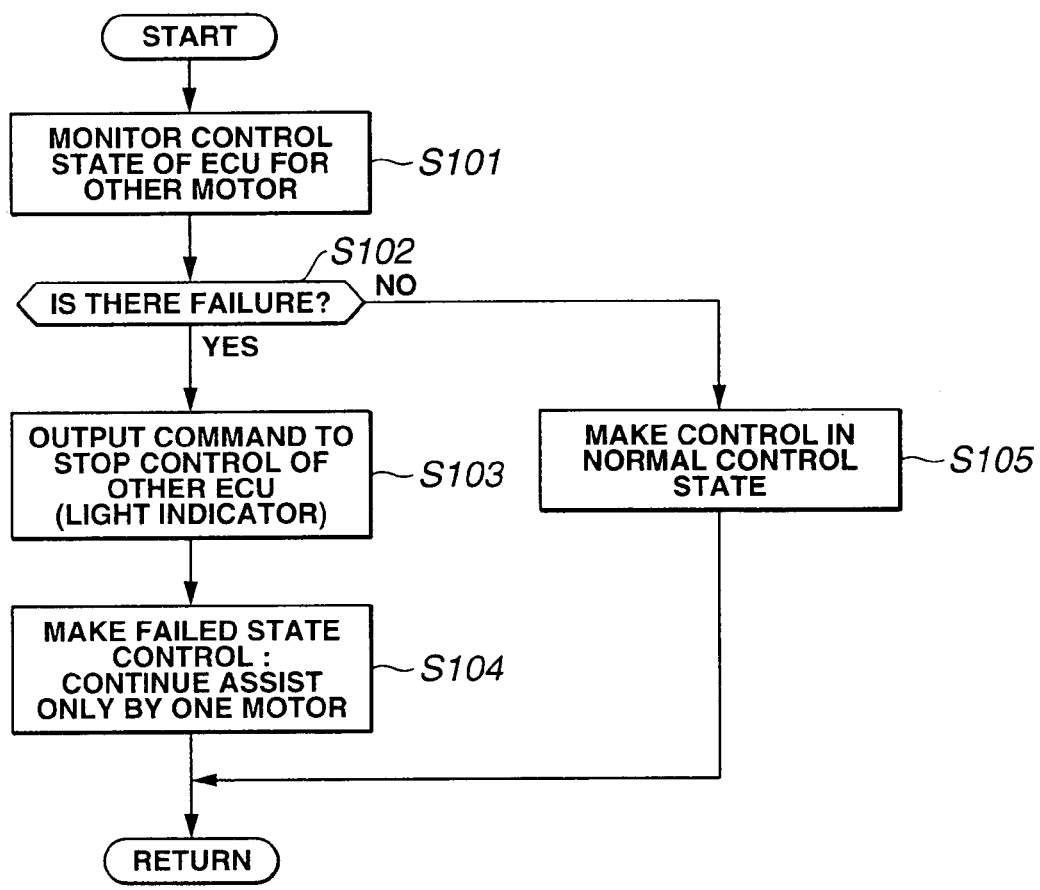
FIG. 9 is a flow chart showing flow of processing in a mutual failure monitoring control between a first ECU and a second ECU in the electric power steering system of FIG. 1.

Operation of Failure Monitoring Control Between First Unit and Second Unit Each Other FIG. 9 is a flow chart showing flow of processing in a failure monitoring control between first ECU 500 and second ECU 600 each other, according to the first embodiment. Hereinafter, each step will be discussed with reference to FIG. 9.

At step S101, first and second ECUs 500, 600 monitor the control states of them each other. Then, a flow goes to step S102.

At step S102, first and second ECUs 500, 600 judge each other whether the other ECU (the first ECU for the second ECU, or second ECU for first ECU) is failed or not in control state. In case that one ECU finds failure in the other ECU, the flow goes to step S103. In contrast, in case that one ECU does not find failure in the other ECU, the flow goes to step S105.

At step S103, one ECU in the normal control state stops the control of the other ECU failed in control state and lights an indicator. Then, the flow goes to step S104.

At step S104, the steering assist is continued only by the motor at the side of the ECU in the normal control state, as a failed state control. Then, the control is terminated.

At step S105, the steering assist is made by the two motors, as a control in a normal (control) state. Then, the control is terminated.

State of Full-Assist in Same Direction by Two Motors

Figure 10A:
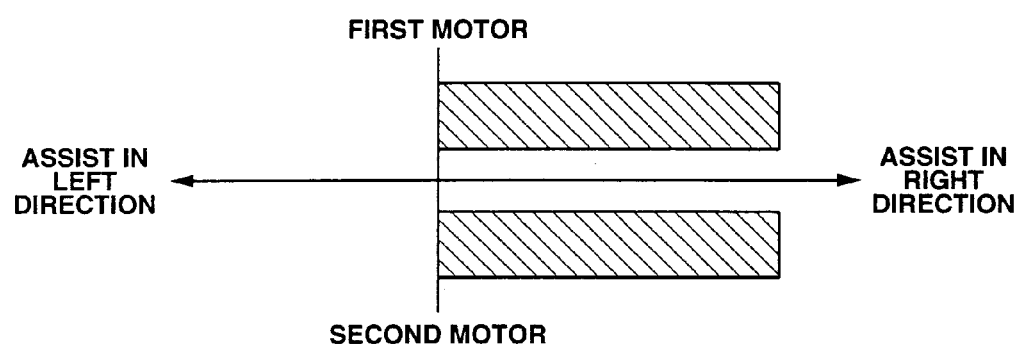
FIG. 10A is a graphical representation showing a control state of the electric power steering system of FIG. 1, wherein both first and second motors are in a state of being full-assisted in the same steering direction.
Figure 10B:
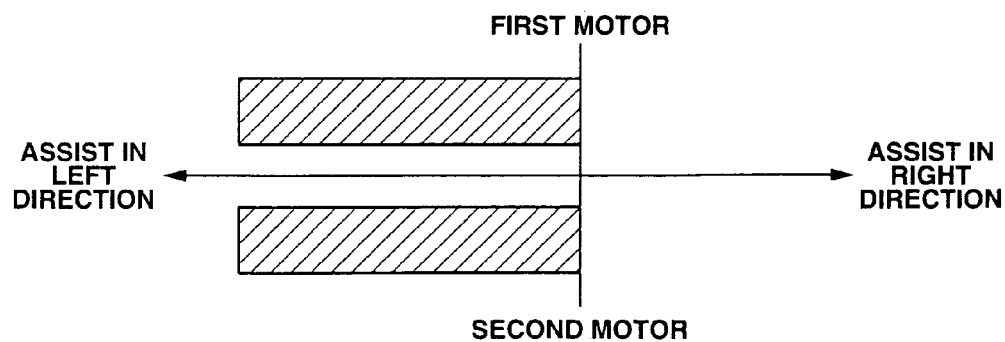
FIG. 10B is a graphical representation showing another control state of the electric power steering system of FIG. 1, wherein both first and second motors are in a state of being full-assisted in the same steering direction.

FIGS. 10A and 10B are graphical representations showing control states of the electric power steering system according to the first embodiment, in which both first and second motors 121, 221 are driven in maximum in the same steering direction so as to accomplish a state of full-assist. In case that a large steering assist torque is necessary, a steering torque is full-assisted by both first motor 121 and second motor 221 generating assist forces in the same steering direction, thereby securing a necessary assist torque. Here, rack shaft 300 includes two teeth portions i.e., first engaging area 301 to which first pinion 131 is engaged and second engaging area 302 to which second pinion 231 is engaged.

First engaging area 301 and second engaging area 302 respectively have two groups of teeth which are different or opposite in inclination relative to the horizontal plane containing the axis of rack shaft 300. Similarly to a general helical gear, teeth of the rack shaft are inclined relative to the horizontal plane containing the axis of rack shaft, so that the rack shaft receives forces in an axial direction and in a radial direction. Additionally, in this embodiment, the inclination of the teeth in first engaging area 301 to which first pinion 131 is engaged and that in second engaging area 302 to which second pinion 231 is engaged are different or opposite relative to the horizontal plane containing the axis of rack shaft 300. Consequently, rack shaft 300 receives two radial forces whose vectors are opposite to each other in direction, from first and second motors 121, 221 when the two motors are driven in the same steering directions. Therefore, the two motors respectively provide the radial two forces opposite in vector thereby applying a rotational moment to rack shaft 300. The rotational moment acts on first and second pinions 131, 231 so that a rattle between first and second pinions 131, 231 and rack shaft 300 is prevented thereby providing an effect of decreasing a backlash.

State of Non-Assist

Figure 11:
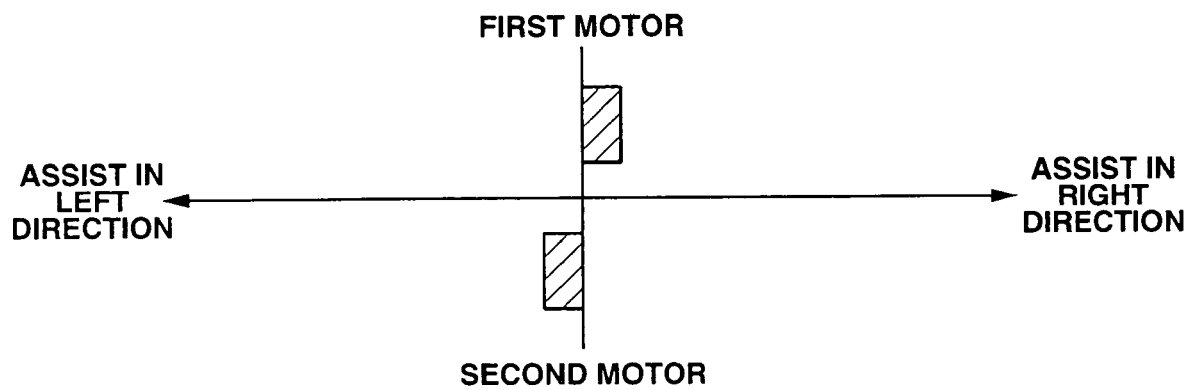
FIG. 11 is a graphical representation showing a control state of the electric power steering system of FIG. 1, wherein both first and second motors are in a state where no steering assist is made.

FIG. 11 is a view showing a control state of the electric power steering system according to the first embodiment, in which both first and second motors 121, 221 make no steering assist, for example, during straight-running or stopping of the vehicle. First and second motors 121, 221 respectively generate small assist forces which are the same in amounts. The assist force from first motor 121 acts in a right direction, while the assist force from second motor 221 acts in a left direction. By this, rack shaft 300 is biased in the right direction by first pinion 131 and in the left direction by second pinion 231, so that first and second motors 121, 221 prevent the rattle between rack shaft 300 and first and second pinions 131, 231. As a result, a driving torque generated by one motor suppresses the backlash in the driving force transmitting system in the other motor. Additionally, the assist forces in the left and right directions are balanced to each other, so that the resultant force of the forces applied to rack shaft 300 becomes zero. This is the same also in case that rack shaft 300 is biased in the left direction by first pinion 131 and in the right direction by second pinion 231.

State of Steering Assist Made Only by One Motor

Figure 12A:
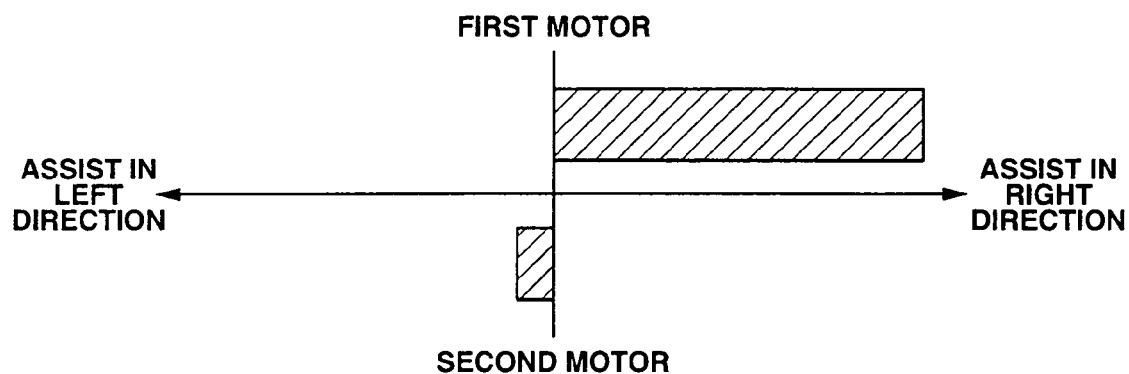
FIG. 12A is a graphical representation showing a control state of the electric power steering system of FIG. 1, wherein steering is assisted by one of first and second motors.
Figure 12B:
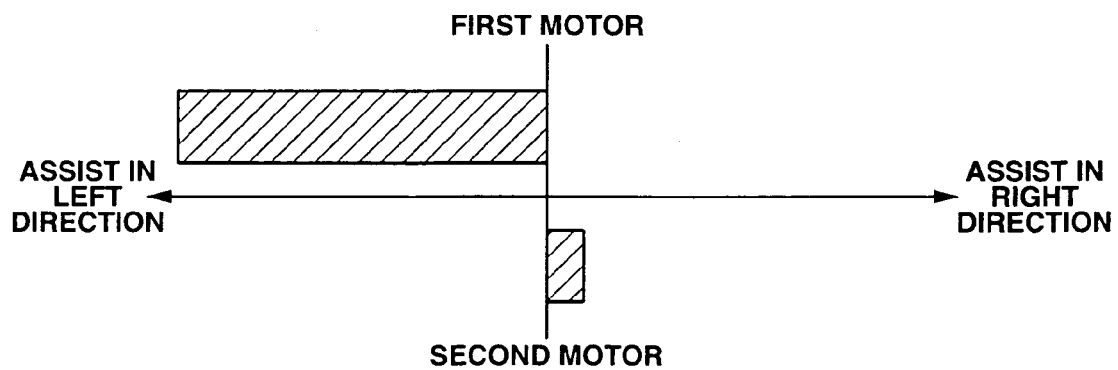
FIG. 12B is a graphical representation showing another control state of the electric power steering system of FIG. 1, wherein steering is assisted by one of first and second motors.

FIGS. 12A and 12B are graphical representations showing control states of the electric power steering system according to the first embodiment, in which steering is assisted only by one motor of first and second motors 121, 221. In case of generating an assist torque only by one motor, rack shaft 300 is driven by one pinion thereby generating a rattle between rack shaft 300 and one pinion at the initiation and the termination of steering assist. However, in this embodiment, rack shaft 300 is biased in one direction by one motor generating an assist torque, while a small torque is applied in the opposite direction by the other motor. By this, similarly to the no steering assist state, a state wherein rack shaft 300 is biased in the right direction by first pinion 131 and in the left direction by second pinion 231 is always kept. Consequently, first and second motors 121, 221 prevent the rattle between rack shaft 300 and first and second pinions 131, 231 so that the driving torque generated by one motor suppresses a backlash in the driving force transmitting system of the other motor. Similarly to the no steering assist state, the same effects can be obtained also in case that rack shaft 300 is biased in the left direction by first pinion 131 and in the right direction by second pinion 231.

In this embodiment, first pinion 131 and second pinion 231 respectively engage with first engaging area 301 and the second engaging area 302 in rack shaft 300. Both engaging areas 301, 302 have teeth whose inclinations are different from or opposite to each other relative to the horizontal plane containing the axis of rack shaft 300. However, rack shaft 300 is biased by first pinion 131 in one direction and by second pinion 231 in the opposite direction along the axis of rack shaft 300, for example, in case of the no steering assist state or a state wherein steering is assisted by one motor, the rack shaft 300 is biased in axially opposite directions thereby obtaining a backlash suppression effect regardless of teeth inclination in rack shaft 300. Consequently, in case of the no steering assist state or the state wherein steering is assisted only by one motor, first engaging area 301 with which first pinion 131 engages and second engaging area 302 with which second pinion 231 engages may respectively have two groups of teeth whose inclinations are the same in rack shaft 300. If the inclinations are the same, used engaging areas with which first and second pinions 131, 231 engage are overlapped with each other thereby improving a freedom in layout and making a cost reduction possible.

Comparison in Effect Between Conventional Technique and First Embodiment of Present Invention In the conventional electric power steering system of the dual pinion type as disclosed in Japanese Patent Provisional Publication No. 2002-154442, assist torque is provided to a rack shaft through two pinions. A steering torque from a driver and a steering assist torque from an electric motor are separately loaded to the two pinions, respectively. Therefore, there is a merit of decreasing load provided to the pinions. However, in case that this arrangement is applied to a large-sized vehicle that needs a larger assist torque, there arises a problem that sufficient steering assist torque cannot be secured since steering assist torque is generated by only one motor as same as usual conventional electric power steering systems. Additionally, if a larger motor is used for providing a larger steering assist torque, there also arises a problem that one pinion becomes over-loaded because the conventional electric power steering system of the dual pinion type has a configuration in which the assist torque generated by a motor is loaded to only one pinion.

On the other hand, in the first embodiment of the present invention, torque sensor 20 is provided on the steering shaft connected with steering wheel 10. First and second pinions 131, 231 respectively connected with first motor 112 and second motor 221 are so mounted on rack shaft 300 as to be separate. First and second motors 121, 221 are respectively driven by first and second ECUs 500, 600 in accordance with the steering torque detected by torque sensor 20 so that the assist torques generated by first and second motors 121, 221 are provided to rack shaft 300. By this, first and second motors 121, 221 which generate an assist torque are respectively disposed to a pair of first and second pinions 131, 231. Consequently, it become possible to generate a larger assist torque while suppressing a load provided to each pinion. Therefore, the motors of the electric power steering system of this embodiment can be prevented from being large-sized and can secure a sufficient steering assist torque also in a large vehicle which needs a large steering force. Additionally, since steering assist torque is provided to rack shaft 300 by both first and second motors 121, 221, load given to each pinion can be decreased.

In the state that the steering assist is zero, the two motors are driven with a small torque in the opposite directions to each other. In the state accomplishing the steering assist only by one motor, one motor generates an assist torque while the other motor generates and provides the small torque in a direction opposite to the direction of the steering assist. By this, rack shaft 300 becomes possible to be biased always from the left and right axial directions by first and second pinions 131, 231 upon two motors being driven to in the directions opposite with each other. Consequently, the driving force transmitting system of one motor is prevented from generating the rattle upon driving torque being generated by the other motor, thereby suppressing the backlash. Especially at the initial time of the steering assist such as a time when the driver starts to steer during straight running of the vehicle, or at the steering direction reversing time of steering assist such as a time when a steering direction is reversed during steering, the effect for suppressing backlash become more remarkable as compared with a technique that the rack shaft is not biased from the right and left axial directions of the rack shaft by two motors.

OTHER EMBODIMENTS

As discussed above, discussion has been made on the best mode for carrying out the present invention with reference to the first embodiment. The invention is not limited to the embodiment described above. Modifications and variations of the embodiment described above will occur to those skilled in the art, in light of the above teachings.

Figure 13:
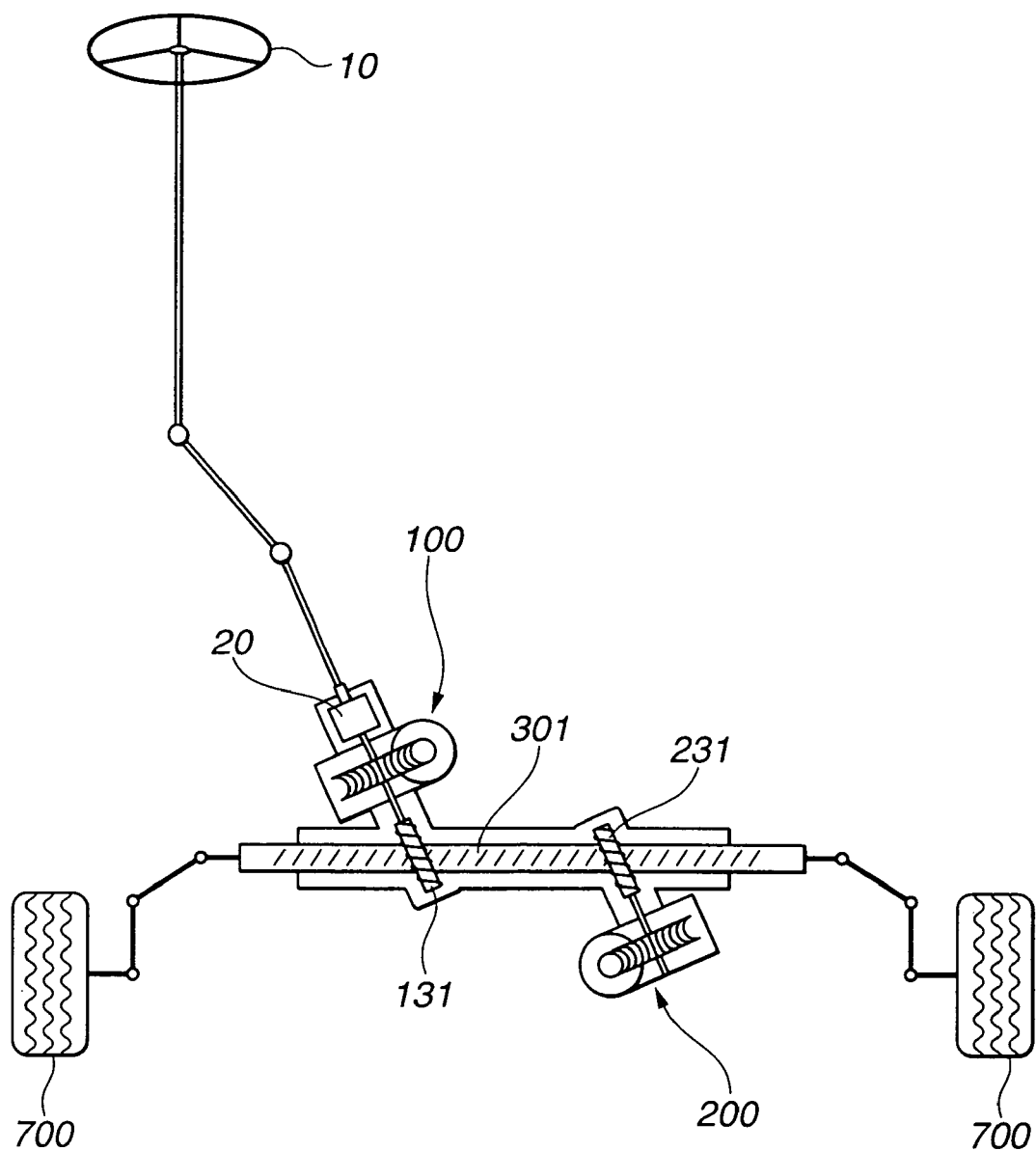
FIG. 13 is a schematic illustration of another embodiment of the electric power steering system according to the present invention.

Although both first and second units 100, 200 are disposed at an upper side relative to rack shaft 300 and installed from the upper side of the vehicle so as to be separate from each other in the axial direction of rack shaft 300 in the first embodiment, only first unit 100 may be disposed at the upper side relative to rack shaft 300 from the upper side of the vehicle, while second unit 200 may be disposed at the lower side relative to rack shaft 300 and installed from the lower side of the vehicle so as to be separate from first unit 100 in the axial direction of rack shaft 300, as shown in FIG. 13.

Figure 14:
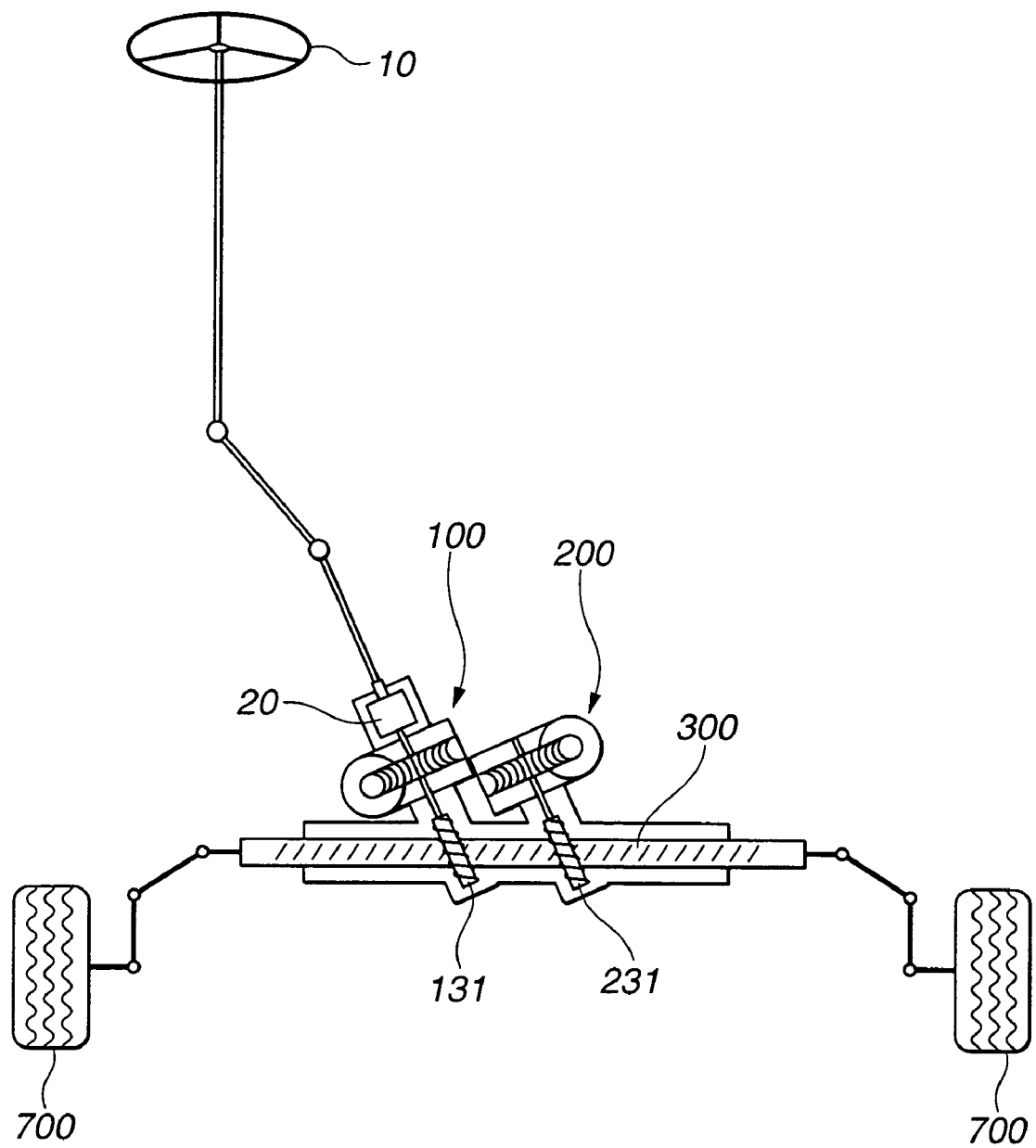
FIG. 14 is a schematic illustration of a further embodiment of the electric power steering system according to the present invention.

Additionally, as shown in FIG. 14, first and second units 100, 200 may be disposed at the upper side relative to rack shaft 300 and installed from upper side of the vehicle in such a manner as to be overlapped with each other in the axial direction of the rack shaft. In this case, both first and second units 100, 200 may be disposed in a one-piece housing thereby making the unit more compact in size.

Figure 15:
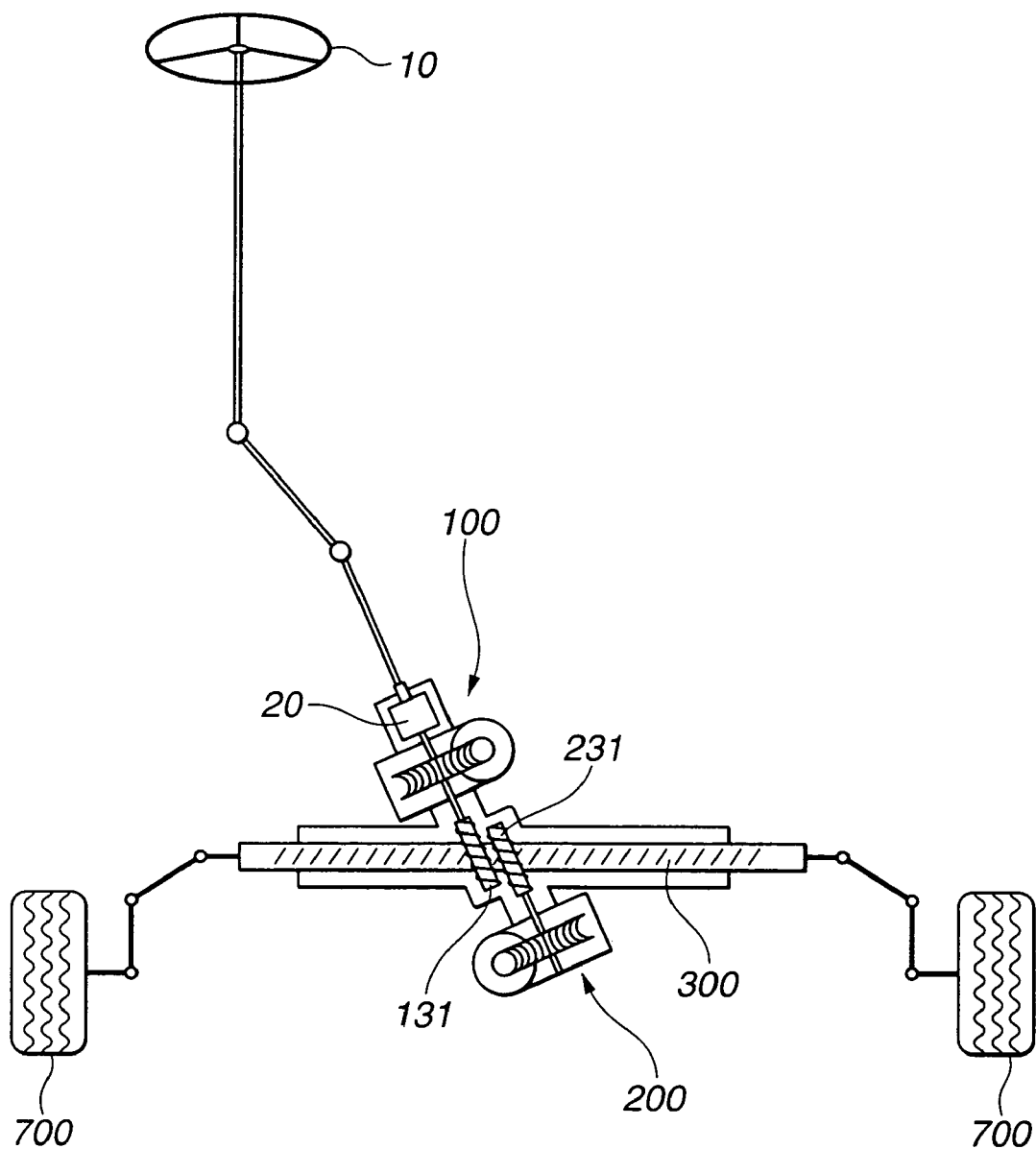
FIG. 15 is a schematic illustration of a still further embodiment of the electric power steering system according to the present invention.

Furthermore, as shown in FIG. 15, first and second units 100, 200 disposed respectively at the upper and lower sides relative to rack shaft 300 and installed from the upper side and the lower side of the vehicle body in such a manner as to be overlapped with each other in the axial direction of the rack shaft. Thus, by suitably changing the positions of first and second units 100, 200, appropriate mounting manners can be achieved in accordance with other parts mounted on the vehicle.

Hereinafter, discussion will be made on technical ideas and effects comprehended from the above-mentioned embodiments.

(a) An electric power steering system comprises a steering shaft disposed to a steering wheel. A torque sensor disposed to the steering shaft to detect a steering torque generated by the steering shaft. A first pinion is disposed to the steering shaft. A rack shaft is in mesh with the first pinion and connected with the steering shaft to change a rotational motion of the steering shaft to an axial motion of the rack shaft and to be operated in relation to the steering shaft. A first motor is connected with the first pinion to generate a steering assist torque in accordance with the steering torque detected by the torque sensor. A second pinion is disposed to be separate from the first pinion and in mesh with the rack shaft. A second motor is connected with the second pinion to generate a steering assist torque in accordance with the steering torque.

With this configuration, a sufficient steering assist torque can be secured even in case of applying the electric power steering system to a vehicle which needs a larger steering assist torque.

(b) In the above electric power steering system as described in (a), the steering shaft includes an input shaft connected with the steering wheel, a first pinion shaft disposed to the first pinion and a torsion bar which is arranged between the input shaft and the first pinion shaft. Here, the electric power steering system further comprises a first worm shaft disposed to an output shaft of the first motor, a first worm wheel engaged with the first worm shaft and disposed on the first pinion shaft, a second worm shaft disposed to an output shaft of the second motor, a second pinion shaft disposed to the second pinion, and a second worm wheel disposed on the second pinion shaft and engaged with the second worm shaft. Here, the first motor provides the steering assist torque to the rack shaft through the first worm shaft and the first worm wheel. Here, the second motor provides the steering assist torque to the rack shaft through the second worm shaft, the second pinion shaft and the second worm wheel. Here, the first and second motor are the same in type or structure as each other. Here, the first pinion shaft and the second pinion shaft are the same in type or structure as each other. Here, the first worm shaft and the second worm shaft are the same in type or structure as each other. Here, the first worm wheel and the second worm wheel are the same in type or structure as each other.

With this configuration, a lot of component parts can be commonly used thereby lowering a manufacturing cost.

(c) In an electric power steering system as described in (a), a generally cup-shaped first pinion housing is provided for accommodating mainly the first worm wheel and the first pinion shaft. A sensor housing is incorporated with the first pinion housing and accommodates manly the torque sensor and the input shaft. A generally cup-shaped second pinion housing is provided. Additionally, a lid member is incorporated with the second pinion housing. The second worm wheel and the second pinion shaft are accommodated in the incorporated pinion housing and the lid member. Here, the first and second pinion housings are the same in type or structure as each other.

With this configuration, first and second pinion housings can be commonly used thereby lowering a manufacturing cost.

(d) In the electric power steering system as described in (a), the first pinion and the second pinion respectively have numbers of teeth which numbers are not dividable by each other and different from each other.

With this configuration, the first motor for rotationally driving the first pinion is different in rotational period from the second motor for rotationally driving second pinion so that the first and second motors can cancel periodic vibrations with each other.

(e) In the electric power steering system as described in (a), when one of the first motor and the second motor is drivingly controlled, the other motor is driven with a small torque in a direction opposite to that in which the one of the first motor and the second motor is driven.

With this configuration, in case that steering can be achieved with a small steering assist torque, the steering is assisted only by one motor, while the other motor is driven with a small torque in the opposite direction to the one motor. Therefore, the driving torque of the other motor acts in such a direction to suppress the backlash of the driving force transmitting system of the one motor thereby improving a driving efficiency.

(f) In the electric power steering system as described in (a), the rack shaft has a first engaging area with which the first pinion is engaged and a second engaging area with which the second pinion is engaged. The first and second engaging areas respectively have first teeth and second teeth whose inclinations are different with each other relative to a plane containing an axis of the rack shaft.

With this configuration, forces generated upon engagements between the pinions and the rack shaft act in a direction to decrease a backlash in each engagement thereby improving a driving force transmitting between the pinion and the rack shaft.

(g) In the electric power steering system as described in (a), the rack shaft has a first engaging area with which the first pinion is engaged and a second engaging area with which the second pinion is engaged, the first and second engaging areas respectively having first teeth and second teeth whose inclinations are the same as each other relative to a plane containing an axis of the rack shaft.

With this configuration, the teeth of the rack shaft for the first pinion can be commonly used with the teeth of the rack shaft for the second pinion thereby decreasing a manufacturing cost of the rack shaft. Additionally, it is possible to overlap using areas for the first pinion and the second pinion thereby improving freedom in layout.

The entire contents of Japanese Patent Application P2004-148894 (filed May 19, 2004) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An electric power steering system comprising:
   a steering shaft disposed to a steering wheel;
   a torque sensor disposed to said steering shaft to detect a steering torque generated by said steering shaft;
   a first pinion disposed to said steering shaft;
   a rack shaft in mesh with said first pinion and connected with said steering shaft to change a rotational motion of said steering shaft to an axial motion of said rack shaft and to be operated in relation to said steering shaft;
   a first motor connected with said first pinion to generate a steering assist torque in accordance with the steering torque detected by said torque sensor;
   a second pinion disposed to be separate from said first pinion and in mesh with said rack shaft;
   a second motor connected with said second pinion to generate a steering assist torque in accordance with the steering torque;
   a first control board provided with said first motor;
   a first control circuit for drivingly controlling said first motor, said first control circuit being provided on said first control board;
   a second control board provided with said second motor; and
   a second control circuit for drivingly controlling said second motor, said second control circuit being provided on said second control board;
   wherein the first control circuit monitors an abnormality in control state of the second control circuit, and the second control circuit monitors an abnormality in control state of the first control circuit.

2. An electric power steering system as claimed in claim 1, wherein said first pinion and said second pinion respectively have numbers of teeth which numbers are not dividable by each other and different from each other.

3. An electric power steering system as claimed in claim 1, wherein when one of said first motor and said second motor is drivingly controlled, the other motor is driven with a small torque in a direction opposite to that in which the one of said first motor and said second motor is driven.

4. An electric power steering system as claimed in claim 1, wherein said rack shaft has a first engaging area with which said first pinion is engaged and a second engaging area with which said second pinion is engaged, the first and second engaging areas respectively having first teeth and second teeth whose inclinations are different with each other relative to a plane containing an axis of said rack shaft.

5. An electric power steering system as claimed in claim 1, wherein said rack shaft has a first engaging area with which said first pinion is engaged and a second engaging area with which said second pinion is engaged, the first and second engaging areas respectively having first teeth and second teeth whose inclinations are the same as each other relative to a plane containing an axis of said rack shaft.

6. An electric power steering system as claimed in claim 1, wherein said first pinion is formed integral with the first pinion shaft, and said second pinion is formed integral with the second pinion.

7. An electric power steering system as claimed in claim 1, wherein when an abnormality occurs in one of said first and second motors, a steering assist is continued only by the other motor.

8. An electric power steering system as claimed in claim 1, wherein said first and second pinions extend to said rack shaft respectively from first and second sides which are opposite to each other with respect to a plane containing an axis of said rack shaft.

9. An electric power steering system as claimed in claim 1, wherein said first and second pinions extend to said rack shaft from the same side with respect to a plane containing an axis of said rack shaft.

10. An electric power steering system comprising:
    a steering shaft disposed to a steering wheel;
    a torque sensor disposed to said steering shaft to detect a steering torque generated by said steering shaft;
    a first pinion disposed to said steering shaft;
    a rack shaft in mesh with said first pinion and connected with said steering shaft to change a rotational motion of said steering shaft to an axial motion of said rack shaft and to be operated in relation to said steering shaft;
    a first motor connected with said first pinion to generate a steering assist torque in accordance with the steering torque detected by said torque sensor;
    a second pinion disposed to be separate from said first pinion and in mesh with said rack shaft; and
    a second motor connected with said second pinion to generate a steering assist torque in accordance with the steering torque,
    wherein said steering shaft includes an input shaft connected with the steering wheel, a first pinion shaft disposed to said first pinion, and a torsion bar which is interposed between the input shaft and the first pinion shaft, wherein said electric power steering system further comprises a first worm shaft disposed to an output shaft of said first motor, a first worm wheel engaged with the first worm shaft and disposed on the first pinion shaft, a second worm shaft disposed to an output shaft of said second motor, a second pinion shaft disposed to said second pinion, and a second worm wheel disposed on the second pinion shaft and engaged with the second worm shaft, wherein said first motor provides the steering assist torque to said rack shaft through the first worm shaft and the first worm wheel, wherein said second motor provides the steering assist torque to said rack shaft through the second worm shaft, the second pinion shaft and the second worm wheel, wherein said first and second motors are the same in type as each other, wherein the first pinion shaft and the second pinion shaft are the same in type as each other, wherein the first worm shaft and the second worm shaft are the same in type as each other, wherein the first worm wheel and the second worm wheel are the same in type as each other.

11. An electric power steering system comprising:

a steering wheel to which a steering shaft is connected;

a steering load detecting mechanism for detecting a steering load applied to said steering wheel;

a first pinion;

a rack shaft in mesh with said first pinion and connected with the steering shaft to change a rotational motion of the steering shaft to an axial motion of said rack shaft and to be operated in relation to the steering shaft;

a first motor connected with said first pinion to generate a steering assist torque in accordance with the steering load detected by said steering load detecting mechanism;

a second pinion disposed to be separate from said first pinion and in mesh with said rack shaft;

a second motor connected with said second pinion to generate a steering assist torque in accordance with the steering load;

a first control board provided with said first motor;

a first control circuit for drivingly controlling said first motor, said first control circuit being provided on said first control board;

a second control board provided with said second motor; and a second control circuit for drivingly controlling said second motor, said second control circuit provided on said second control board;

wherein the first control circuit monitors an abnormality in control state of the second control circuit, and the second control circuit monitors an abnormality in control state of the first control circuit.

12. An electric power steering system comprising:

a steering shaft disposed to a steering wheel;

a torque sensor disposed to said steering shaft to detect a steering torque generated by said steering shaft;

a first pinion disposed to said steering shaft;

a rack shaft in mesh with said first pinion and connected with said steering shaft to change a rotational motion of said steering shaft to an axial motion of said rack shaft and to be operated in relation to said steering shaft;

a first motor connected with said first pinion to generate a steering assist torque in accordance with the steering torque detected by said torque sensor;

a second pinion disposed to be separate from said first pinion and in mesh with said rack shaft;

a second motor connected with said second pinion to provide a steering assist torque to said rack shaft;

a first control board provided with said first motor;

first control circuit for drivingly controlling said first motor, said first control circuit being provided on said first control board;

a second control board provided with said second motor; and a second control circuit for drivingly controlling said second motor, said second control circuit being provided on said second control board;

wherein the first control circuit monitors an abnormality in control state of the second control circuit, and the second control circuit monitors an abnormality in control state of the first control circuit.

* * * * *